United States Patent [19]

Schmidt et al.

[11] 4,307,755
[45] Dec. 29, 1981

[54] GLASS FIBER REINFORCED SYNTHETIC RESIN TUBE HAVING INTEGRAL METAL ATTACHMENT

[75] Inventors: Mark A. Schmidt; Marvin D. McKelvy, both of Centralia, Mo.

[73] Assignee: A. B. Chance Company, Centralia, Mo.

[21] Appl. No.: 117,249

[22] Filed: Jan. 31, 1980

[51] Int. Cl.³ .............................................. F16L 11/12
[52] U.S. Cl. .................................... 138/138; 138/103; 138/104; 138/174; 138/178; 174/147
[58] Field of Search .............. 138/103, 104, 106, 128, 138/137, 138, 143, 151, 153, 172, 174, 178, DIG. 2, DIG. 4, 132, 133; 174/47; 428/36; 156/172, 173

[56] References Cited

U.S. PATENT DOCUMENTS

| | | | |
|---|---|---|---|
| 3,070,132 | 12/1962 | Sheridan | 138/103 X |
| 3,277,231 | 10/1966 | Downey et al. | 174/47 |
| 3,580,983 | 5/1971 | Jackson | 174/47 |

FOREIGN PATENT DOCUMENTS

| | | | |
|---|---|---|---|
| 524909 | 5/1956 | Canada | 138/138 |
| 1023440 | 1/1958 | Fed. Rep. of Germany | 138/174 |

Primary Examiner—James E. Bryant, III

[57] ABSTRACT

A synthetic resin, fiberglass reinforced tubular member having an integrally attached metallic element is disclosed, along with a pressure gelation method of fabricating the same. The tubular member is used in making electrical hot line tools, and to this end the metallic element is composited to the tube body without use of metallic fasteners or the like. In practice, a preimpregnated fiberglass material is wrapped about a mandrel to present a predetermined number of layers thereof, whereupon the metallic attachment is temporarily affixed to the fiberglass layer, preferably by placing strips of the wrapped material against the edges of the attachment and in bridging relationship to the wrapping. The fiberglass material is then cured to embed the attachment in the sidewall and yield a fused, void-free monolithic structure. The preferred pressure gelation curing technique also serves to form upraised ridges of fiberglass material along the length of the attachment to further ensure creation of an essentially integral unit.

5 Claims, 6 Drawing Figures

GLASS FIBER REINFORCED SYNTHETIC RESIN TUBE HAVING INTEGRAL METAL ATTACHMENT

BACKGROUND OF THE INVENTION

1. Field of the Invention

The present invention is concerned with an insulative tube structure equipped with an integrally secured, external metallic element such as an elongated lock bar, and a method of manufacturing the tube structure. More particularly, it is concerned with such an insulative unit wherein the metallic attachment is formed as an essentially monolithic part of the tube sidewall by having been embedded in the latter and retained in fixed disposition thereon prior to and during final curing of the resin.

2. Description of the Prior Art

In the manufacture of electrical hot line tools, use is commonly made of elongated, insulative tubes formed of synthetic resin material such as resin (e.g., polyester or epoxy) impregnated fiberglass. inasmuch as these tools are designed for use by linemen working on energized conductors and equipment, it will be appreciated that the insulative integrity of the tubes used in the tools must be very high.

In many cases hot line tools of the type described are equipped with metallic attachments on at least certain of the synthetic resin tubes. For example, some devices of this type are equipped with elongated, metallic lock bars which secure movements of a control rod. While it would be possible to attach such lock bars by means of metallic fasteners through the tube sidewalls, it will be appreciated that this is undesirable from the standpoint of electrical insulative qualities. At the same time, it is vitally necessary that the lock bars be firmly secured to the associated tubes, in order that the lock bars serve their intended function.

Patents describing various methods of attaching metal articles to substrates such as synthetic resin bodies include the following: U.S. Pat. Nos. 4,114,962, 3,700,512, 3,925,132, 3,775,207, 3,116,547, 2,666,007 and 3,047,191.

SUMMARY OF THE INVENTION

The present invention provides a greatly improved electrically insulative unit in the form of an elongated, cured synthetic resin tube having a sidewall of predetermined thickness, along with a metallic attachment integrally joined to and at least partially embedded in the sidewall of the tube with one face of the attachment exposed. The attachment forms an essentially monolithic part of the sidewall of the tube by having been embedded in the tube sidewall and retained in place thereon during fabrication of the tube both prior to and during final curing of the resinous material.

In fabrication procedures, the unit is preferably formed by first wrapping a series of layers of a flexible material, impregnated with a curable synthetic resin, around a mandrel or the like, followed by positioning the metallic attachment on one of the layers and temporarily affixing the attachment to the layer. Pieces of the flexible material are placed along at least certain of the edges of the attachment, and the entire composite is cured in a manner to cause the synthetic resin substance to flow under and around the margins of the attachment in order to permeate and penetrate all initially void areas and thus to integrally mount the attachment to the tube sidewall.

The preferred curing method involves a pressure gelation technique wherein the wrapped material having the temporarily affixed attachment thereon is enclosed within a flexible, elastic tube-like assembly within a curing oven. In this fashion the synthetic resin material is softened and the presence of the tubular sleeve ensures that all air pockets and voids are removed; moreover, this process serves to form upstanding marginal ridges along the length of the attachment. This further enhances the integral connection between the tube and attachment.

DESCRIPTION OF THE PREFERRED EMBODIMENT

Figure 1:
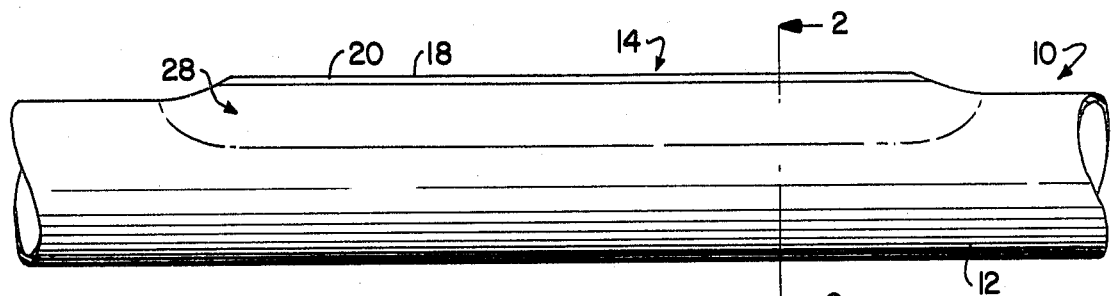
FIG. 1 is a side elevational view of a completed insulative tubular unit in accordance with the invention, having an elongated metallic lock bar integrally joined to the tube.
Figure 4:
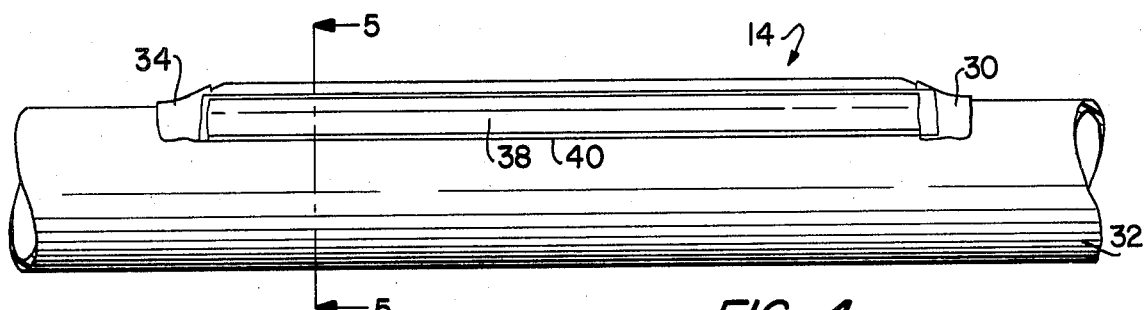
FIG. 4 is a view similar to that of FIG. 3, but illustrating placement of elongated strips of the resin-impregnated fiberglass material along the side margins of the metallic attachment.
Figure 3:
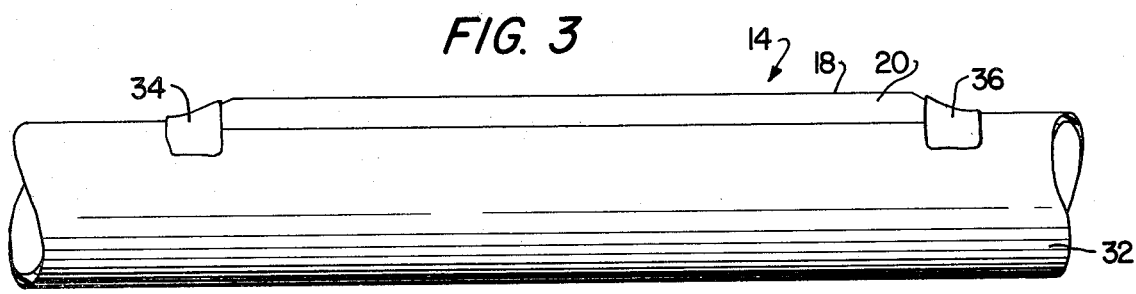
FIG. 3 is a fragmentary side elevational view illustrating a step in the production of the tube depicted in FIGS. 1-2, with the lock bar temporarily mounted on the surface of resin-impregnated fiberglass material.
Figure 2:
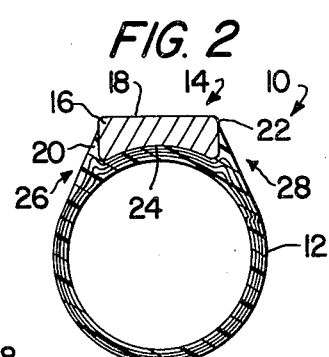
FIG. 2 is a vertical sectional view taken along line 2—2 of FIG. 1.

Turning now to the drawing, an electrically insulative unit 10 in accordance with the invention is illustrated in FIGS. 1 and 2. The unit 10 includes an elongated, cured synthetic resin tube 12 having a sidewall of predetermined thickness, along with a metallic attachment 14 integrally joined to and at least partially embedded in the sidewall of the tube (see FIG. 2) with one face of the attachment exposed. The attachment 14 thus forms a monolithic part of the sidewall of the tube by having been embedded in the tube sidewall and retained in fixed disposition relative thereto during fabrication of the unit prior to and during final curing of the resin.

In the particular embodiment illustrated, attachment 14 is in the form of an elongated lock bar 16 presenting an outermost rectangular face 18, elongated sidewalls 20, 22, and a concave inner face 24. Referring to FIG. 2, it will be seen that the sidewall of tube 12 and face 24 present mutually complementary, interengaging concave and convex surfaces. Moreover, respective elongated transition portions 26, 28 of the sidewall of tube 12 are formed to present smooth upstanding ridge-like projections along the length of sidewalls 20, 22 with resin material abutting the latter. These ridges enhance the joinder of attachment 14 to the tube sidewall and are such that the resin material completely penetrates and permeates the ridges. In sum, an essentially monolithic and integral unit 10 is presented with a complete absence of metallic pins or the like through the sidewall of tube 12 for securing attachment 14 thereto.

Referring now to FIGS. 3-6, the preferred method of manufacture of the unit 10 is schematically illustrated. In the initial stages of manufacture (see FIG. 3) a selected flexible material, impregnated with a curable synthetic resin substance, is wrapped about a mandrel 30 using conventional techniques. The wrapping material 33 is applied to mandrel 30 in a manner to present a series of concentric layers or convolutions, of material, as will be readily understood. The material 32 is preferably a fiberglass cloth impregnated with a synthetic resin substance selected from the group consisting of the epoxy and polyester resins. In practice, it has been found that a product such as sold by Fiberrite Corp. of Orange, Calif., under the designation "MXB-7016" is very useful. This product is described in a brochure entitled "MXB-7016 300° F. Service Glass-Epoxy Prepreg", and this brochure is incorporated by reference herein.

More generally however, it is to be understood that a "prepreg" normally refers to a supporting or reenforcing web which has been impregnated with a liquid or solid epoxy resin binder (usually "B" stage). Typical resins are BPA epoxies having molecular weights of from 360 to 2,000. Common hardeners are: dicyaniamide (dicy), diaminodiphenyl sulfane, benzyl trifloride monoethylamine ($BF_3MEA$), benzyl dimethylamine (BDMA). In practice, the resins are dissolved in suitable solvents (e.g., acetone, dimethyl formamide), and the resulting solution is used to impregnate a cloth (such as a 1543 or a 181 style weave fiberglass cloth), and the composite is then "dried" or B-staged.

When using a wrapping material of the type specified above, the material is pretreated by heating to a temperature of about 250° F. for approximately one to two minutes, which is insufficient to cure the preimpregnated fiberglass, but renders the same soft and pliable for ease of wrapping about mandrel 30. Furthermore, during the wrapping operation, heat and pressure may be applied through use of heated rotating bars (not shown) adjacent mandrel 32.

When material 32 is wrapped to a desired thickness about mandrel 30, attachment 14 is temporarily affixed to the material with a conventional adhesive such as a cyano acrylate material. This involves placing interface 24 of attachment 14 against the arcuate surface presented by the wrapped material 32, whereupon strips 34, 36 of the prepreg material are then placed over the opposed ends of the attachment (see FIG. 3). The strips 34,36 are tacked to the underlying material such as through the use of a heated iron.

Figure 5:
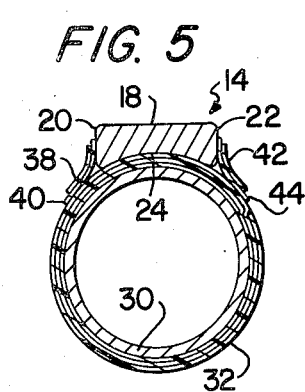
FIG. 5 is a vertical sectional view taken along line 5—5 of FIG. 4.
Figure 6:
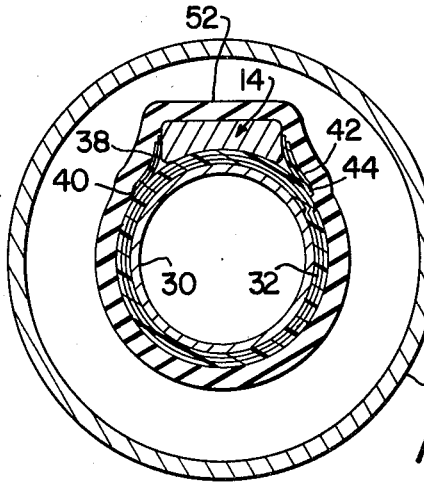
FIG. 6 is a sectional view illustrating the preferred final curing process wherein the composite depicted in FIGS. 4-5 is placed within a flexible pressure sleeve and cured in an oven.

The initial composite is then completed by placing respective pairs 38, 40 and 42, 44 of strips of the prepreg material along the longitudinal edges of the attachment 14. As best seen in FIG. 5, these pairs of strips are placed in bridging relationship between the attachment sidewalls 20, 22, and the underlying, wrapped material 32. Here again, a heated iron may be used to temporarily tack the strips in place.

The final step of the process involves curing of the composite in order to create a fused, integrated, monolithic unit which is free of all initial voids. Final curing is preferably accomplished using a so-called pressure gelation process. To this end, curing apparatus 46 (see FIG. 6) is provided. Apparatus 46 includes an elongated, tubular curing oven 48 having a central, tubular, mandrel support and an elastomeric sleeve 52 supported within the oven and connected to the end walls of the latter. Conventional means is provided (not shown) for supplying hot, pressurized air to the oven 48 between the outer tubular wall thereof and sleeve 52. In curing operations, the composite of the mandrel-wrapped material 32 having attachment 14 temporarily secured thereto, is treated as follows. First, the elastomeric sleeve 52 is drawn open radially by application of a vacuum in the chamber or oven 48 between outer chamber wall and the sleeve. The composite is then placed within the expanded confines of the sleeve 52, and the vacuum is relieved and replaced by air pressure applied in conjunction with heat (i.e., by supplying heated air to the inside of tubular mandrel 32). The initial phase cure is used to "work" the preimpregnated material 32 to remove air pockets and to cause the resin substance therein to flow evenly. This is accomplished by maintaining conditions of temperature of about 250° F. and applying air pressure in 30 p.s.i. increments up to a level of 120 p.s.i. The initial phase lasts 15 minutes at which time the air pressure is raised to 150 p.s.i. and the temperature is raised to 300° F. This lasts for a period of about 30 minutes, so the total cure cycle lasts 45 minutes.

During curing, as the synthetic resin substance becomes flowable, the substance completely penetrates and permeates all initial void areas in the composite. Moreover, at least certain of the outermost convolutions of the material 32 (see FIG. 2) form upraised portions presenting upstanding ridges along the length of the attachment 14. Such ridges are complemental to and in engagement with the adjacent edges of the attachment 14 in order to enhance the joinder of the latter to the tube sidewall. As depicted, the cured resin completely penetrates and permeates the ridges, the convolutions of fiberglass, and the initially void areas between the attachment and ridges. This ensures that the attachment and sidewall define a substantially void-free, unitary structure.

Placement of the strip pairs 38, 40 and 42, 44 further ensures that synthetic resin material will sealingly abut sidewalls 20, 22 of the attachment. This also forms smooth transitional regions between each sidewall of the attachment and the underlying tube.

Having thus described the invention, what is claimed as new and desired to be secured by Letters Patent is:

1. An electrically insulative unit comprising:
   an elongated, cured synthetic resin tube having a sidewall of predetermined thickness, said tube sidewall having a continuous wrap of fiberglass extending the length thereof and with a predetermined number of convolutions of said wrap; and
   a metal attachment integrally joined to and at least partially embedded in the sidewall of the tube with one face of the attachment exposed, said exposed face being free of said wrap, said attachment forming an integral part of the sidewall of the tube by having been embedded in the tube sidewall and retained in fixed disposition relative to the tube sidewall during fabrication thereof prior to and during final curing of said resin.

2. The invention as recited in claim 1 wherein a plurality of convolutions of fiberglass form raised portions of the sidewall defining ridges which are complementary to and in engagement with the edges of the attachment on each side for enhancement of joinder of the attachment to the sidewall, there being cured resin completely penetrating and permeating said ridges, said convolutions of fiberglass, and the void areas between the attachment and the ridges to ensure that the attachment and said sidewall define a substantially void-free unitary structure.

3. An electrically insulative unit comprising:
- an elongated, cured synthetic resin tube having a sidewall of predetermined thickness; and
- a metal attachment integrally joined to and at least partially embedded in the sidewall of the tube with one face of the attachment exposed, said attachment forming an integral part of the sidewall of the tube by having been embedded in the tube sidewall and retained in fixed disposition relative to the tube sidewall during fabrication thereof prior to and during final curing of said resin,
- said attachment and the sidewall of said tube having mutually complementary, interengaging concave and convex surfaces respectively, with a portion of the sidewall overlapping and complementally engaging respective edges of the attachment.

4. The invention as recited in claim 3, said tube having raised portions of the sidewall defining ridges complementary to and which are in engagement with the edges of the attachment along the length thereof and on each side of said attachment for enhancing joinder of the attachment to the sidewall, there being cured resin completely penetrating and permeating said ridges and the initially void areas between the attachment and the ridges to ensure that the attachment and said ridges define a substantially void-free unitary structure.

5. An electrically insulative unit comprising:
- an elongated, cured synthetic resin tube having a sidewall of predetermined thickness; and
- a metal attachment integrally joined to and at least partially embedded in the sidewall of the tube with one face of the attachment exposed, said attachment forming an integral part of the sidewall of the tube by having been embedded in the tube sidewall and retained in fixed disposition relative to the tube sidewall during fabrication thereof prior to and during final curing of said resin,
- there being elongated strips of synthetic resin impregnated fiberglass positioned adjacent to at least certain of the edges of said attachment, said strips being disposed longitudinally of said tube on each side of said attachment, said strips being disposed in bridging engagement between the attachment and the sidewall of said tube for presenting a continuous, smooth transitional section between said sidewall and said attachment.

* * * * *